Nov. 19, 1968   L. G. ELLIS   3,412,373
METHOD OF SEISMOGRAPHIC ANALYSIS
Filed Feb. 1, 1967   7 Sheets-Sheet 1

FIG. 1.

INVENTOR.
LACOSTE G. ELLIS
BY
ATTORNEYS

Nov. 19, 1968        L. G. ELLIS        3,412,373
METHOD OF SEISMOGRAPHIC ANALYSIS
Filed Feb. 1, 1967        7 Sheets-Sheet 3

FIG. 6.

INVENTOR.
LACOSTE G. ELLIS
BY
ATTORNEYS

Nov. 19, 1968   L. G. ELLIS   3,412,373
METHOD OF SEISMOGRAPHIC ANALYSIS
Filed Feb. 1, 1967   7 Sheets-Sheet 4

INVENTOR
LACOSTE G. ELLIS
BY
ATTORNEYS

Nov. 19, 1968         L. G. ELLIS         3,412,373

METHOD OF SEISMOGRAPHIC ANALYSIS

Filed Feb. 1, 1967         7 Sheets-Sheet 5

FIG. 7.

INVENTOR.
LACOSTE G. ELLIS
BY
ATTORNEYS

ёunited States Patent Office 3,412,373
Patented Nov. 19, 1968

3,412,373
METHOD OF SEISMOGRAPHIC ANALYSIS
Lacoste G. Ellis, Beaumont, Tex., assignor to Sun Oil Company Philadelphia, Pa., a corporation of New Jersey
Filed Feb. 1, 1967, Ser. No. 613,217
6 Claims. (Cl. 340—15.5)

ABSTRACT OF THE DISCLOSURE

A method of processing seismographic data provided by a shot stacking technique. The long spread data from a group of depth points is included in a record presentation in such a manner that the presentation will show whether these long spread data have been corrected fully by the normal stepout corrections. The method serves to permit differentiation between primary and multiple reflections.

Background of the invention

This invention relates generally to a method of seismographic analysis, and more particularly to a technique of processing shot stacking data so as to reveal multiple reflections on the final record.

It is, of course, customary practice in the art of geophysical prospecting to obtain records from a plurality of detector stations in response to an explosive shot fired at the surface of the earth. The detectors receive energy from the shot in the form of waves reflected from various subsurface earth strata. As a result of the difference in displacement or the spread between each of the detector stations and the shotpoint, there will appear a time displacement among the records made at each of the detector stations. This displacement is commonly termed "stepout." It is dependent upon the spacing of each of the detectors from the shotpoint and is variable for depth of recording for each detector. The amount of stepout decreases with the depth from which reflected waves are received at any particular detector. A stepout adjustment is desirable in order that the reflected waves reaching each of the detectors from a horizontal stratum will appear on the reproduced records at similar positions, i.e., corresponding to each particular depth of reflection. The normal stepout adjustment required can be calculated from known earth velocities in any particular region and the distances between the detectors and the shotpoint. In accordance with conventional procedure, the records are compensated for the normal stepout displacement. There are various well-known procedures and apparatus whereby the individual originally recorded records on a record tape carrying a plurality of records as received at a plurality of detectors from a single shot may be corrected and reproduced.

One of the problems involved in the analysis of seismic records is that of differentiating between primary reflections and multiple reflections. In this regard, about the only evidence available is the difference in the normal stepout between such reflections. The difference in stepout is quite small for the shorter spread distances but becomes considerable as the spread length is increased. Thus, when multiple reflections are known to be a problem in an area, the horizontal stacking techniques used in the exploration thereof employ long spreads so that the difference in stepout between the multiple reflections and the primary reflections is appreciable. In the processing of these records, the normal stepout of the primary reflection is removed, but there remains, in the process record, multiple reflections which with the stepouts which are not fully corrected. This uncorrected stepout has been referred to as "residual stepout" and will be so referred to in this application. If the residual stepout is large, then the stacking process may result in considerable cancellation. However, with prior processing techniques, there is no assurance that the cancellation is effective and there is no indication as to how effective it is. Moreover, if there are complex or internal multiples where the stepouts are quite small, there might be very little, if any, cancellation.

Summary of the invention

It is the general object of the invention to provide a technique or method of processing shot stacking data so as to provide on the final data, which are to be used for interpretation, i.e., the processed records or record sections, a clue which will reveal simple multiples and complex multiples. The technique in accordance with the invention will also offer a clue to any other event which may not be a true reflection, such as an event which has undergone refraction. Briefly stated, the technique in accordance with the invention involves the selection from a single depth point, or group of closely spaced depth points, the long spread data from the group and including them in the presentation in such a manner that the presentation will show whether these longer spread data have been fully corrected by the normal stepout corrections.

Description of preferred embodiment

The method in accordance with the invention is adapted for use with the technique of seismic exploration known as "horizontal shot stacking." While this technique is also referred to as "horizontal stacking," "common depth point," "multiple coverage," and "roll along drop along," these techniques all accomplish substantially the same end results and are simply different names for the same general technique. For purposes of this application, the term "horizontal shot stacking" is used to cover all of these techniques used today.

Figure 1:
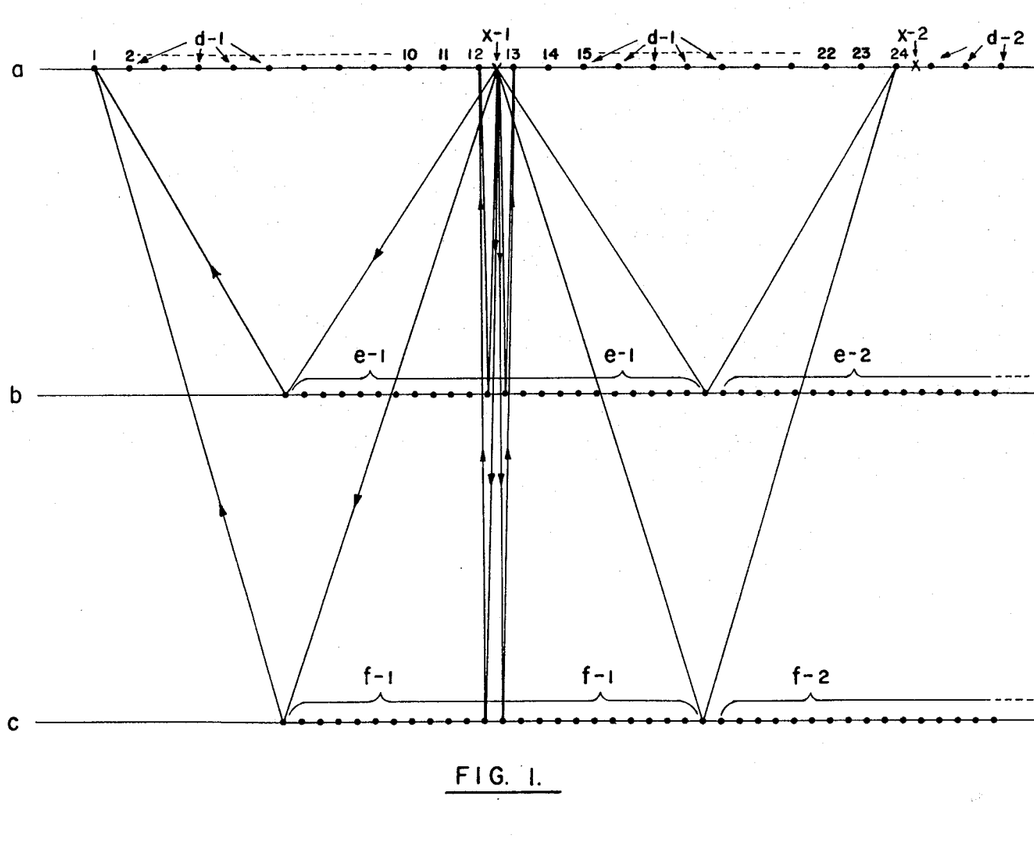
FIGURE 1 is a schematic representation of the procedure involved in seismographic exploration in accordance with well known practices.

By way of background and to provide a better understanding of horizontal shot stacking techniques in use today, reference is made to FIGURE 1 in which a more conventional surface spread is illustrated. On the surface, X–1 represents the location of the first shotpoint and d–1 represents the location of the detectors for the detonation of the first shot. The detectors are of the conventional type of instrument sensitive to earth vibrations. In accordance with one conventional procedure, detectors are usually located in line with the shotpoint at intervals of approximately 200 feet and ordinarily twenty-four detectors are used.

When a charge of explosive is detonated at position X–1, energy travels downward into the earth and is reflected back toward the surface from the reflection horizons such as b and c. For the purpose of illustration, the travel path of this energy can be represented by straight lines as shown on the figure. Energy travelling vertically downward is reflected back to the stations close to the shotpoint as illustrated by the path lines to detectors 12 and 13. Energy is reflected back to other detectors in both directions outward to the end detectors 1 and 24. The paths to detectors 1 and 24 are shown but intervening paths are omitted from the illustration for the sake of clarity. The positions on the subsurface horizons $b$ and $c$ from which reflections are obtained are indicated by $e$–1 and $f$–1, respectively. The interval between these successive points is half the interval between the detectors on the surface. (For example, if the detector interval is 200 feet the interval between the points on the subsurface will be 100 feet.) The procedure represented by the illustration is referred to as one location and it is indicated on the final map by the location of the shotpoint X–1. After shooting is completed at location X–1 the shotpoint is then moved to position X–2. The detectors occupying positions 1 to 12 are picked up and moved forward in advance of X–2 to position $d$–2. The detectors $d$–1 at positions 13 through 24 are not moved, but now become positions 1 through 12 for location X–2. In this new position, shots are detonated from X–2 and subsurface coverage is indicated by $e$–2 and $f$–2. Shooting is continued along a line by progressively moving the shotpoint forward a half spread length (12 detector positions) each time, as indicated. The end result is a continuous series of subsurface reflection points evenly spaced at half the surface detector interval. It is important to note, however, that none of the subsurface points is duplicated. There is continuous progression down the line, but the new points begin where the old leave off.

The "horizontal shot stacking' technique is merely a slight modification of the above-described more conventional technique and one example of horizontal shot stacking will be described with reference to FIGURE 1. The arrangement shown in FIGURE 1 can be modified to achieve horizontal shot stacking by moving the shot point X–1 forward only one detector interval (instead of a full half spread) so that its new position is midway between detector positions 13 and 14. In this case only the detector at position 1 is picked up and moved forward to one position beyond 24. Shooting then takes place at this new position and all of the subsurface points will be identically recorded a second time except for the first two which are lost because of the dropping of one detector position and the moving of the shot forward one position and except for the two new points on the opposite end which are added. After this, the whole configuration is moved forward again one detector interval so that the shotpoint is between 14 and 15 and the procedure is repeated. All subsurface reflection points are recorded a third time, except again two are dropped off on the rear and two added on the front. Successive repetition of this procedure will result in repeated recording of each subsurface point 12 times and each recording will be from different spread length. The number of times a particular subsurface point is rerecorded depends upon the increment by which the shotpoint is moved forward each time, and also other factors.

Each of the successive shots and recordings is made on magnetic tape. In the central magnetic processing procedure all 12 recordings from each subsurface point, after corrections for elevation, weathering, and the geometry of travel path, are combined so that there is obtained only one record which represents the sum total of all 12. Inasmuch as the reflections recorded on each of the individual shots will have the same arrival time on all 12 records the amplitude or magnitude of the final record has the theoretical possibility of being 12 times as large. Objectionable energy which may travel other ray paths, and various types of noise, arrive at different times and, therefore, do not add up, but instead may cancel out. The net result is that there has been a very great improvement in reflection interpretability.

The description above is only of one particular type or horizontal shot stacking technique and is a rather extreme case where the shot point interval which yields a large stack is small. Actually there are a number of variations in shot stacking techniques which may yield 4, 6, 8, or 12 stacks, it generally being true that the larger the stack, the more holes required. It is also generally true that the larger the stack, the better the results.

Figure 2:
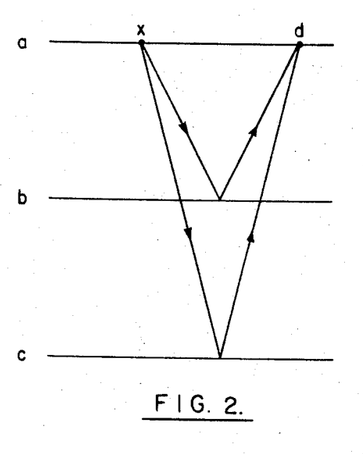
FIGURES 2 to 5 are schematic representations of various types of subsurface reflections involved in seismographic exploration.
Figure 3:
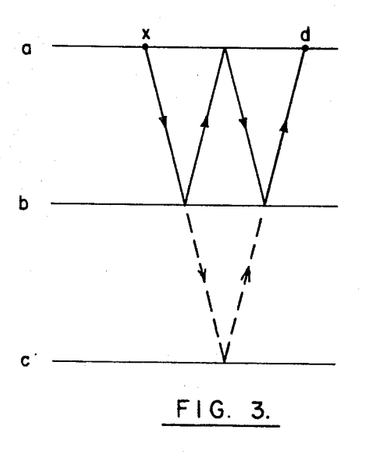

FIGURES 2 and 3 illustrate the differences between primary and multiple reflections. In FIGURE 2, energy from a shot at X on the surface $a$ is reflected from both horizons $b$ and $c$ along travel paths as indicated to detector position $d$. There is one reflection from horizon $b$ and one from horizon $c$, both being true primary reflections.

In FIGURE 3 is illustraed a multiple reflection in solid lines. Energy from the shot at X is reflected first from the horizon $b$ back to the surface, then reflected from a point on the surface midway between X and $d$. The reflected energy travelling over this path is called a multiple reflection because it is reflected more than once. It will be noted that the length of travel path of this multiple reflection is the same, or substantially the same, as though it was really a primary reflection from horizon $c$. In conventional shooting the characteristics of multiple reflections are so similar to those of primary reflections that they cannot be differentiated. They arrive at substantially the same time end, therefore, an interpretation which is based upon the multiple reflection from horizon $b$ will not portray structure at horizon $c$, but rather that at horizon $b$, although this may not be recognized. It should be remembered that multiple reflections, as illustrated in FIGURE 3, are superimposed on the primary reflection as illustrated in FIGURE 2.

Figure 4:
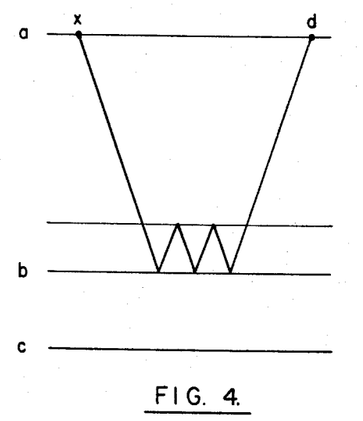
Figure 5:
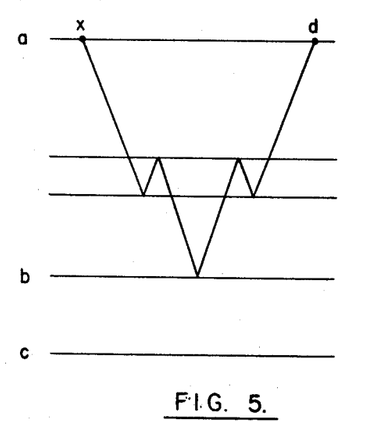

Horizontal shot stacking techniques have provided a fairly effective method of combating the problems of simple or first multiple reflections. However, not only are there simple or first multiple reflections, but there are much more complex patterns of multiple reflections, which for the sake of a better term, are called "internal multiples". Examples of internal multiples are shown in FIGURES 4 and 5. There is really no end to the complexity of travel paths that might be followed by such reflections.

The practice of combining a plurality of seismic records by stacking and mixing them is well known in the seismic surveying art. There is also well known apparatus wherein individual records are delivered to suitable mixing circuits in which corresponding records are mixed and from which the mixed records are delivered to a multi-channel recorder. However, none of the prior procedures have provided an effective stacking technique for the differentiation of primary reflections and the various types of multiple reflections. By means of the technique in accordance with the invention, a process which involves combining the horizontal shot stacking field technique with a novel method of magnetic processing and presentation, there are provided clues by which primary reflections, simple multiple reflections and internal multiple reflections can all be differentiated.

Figure 6:
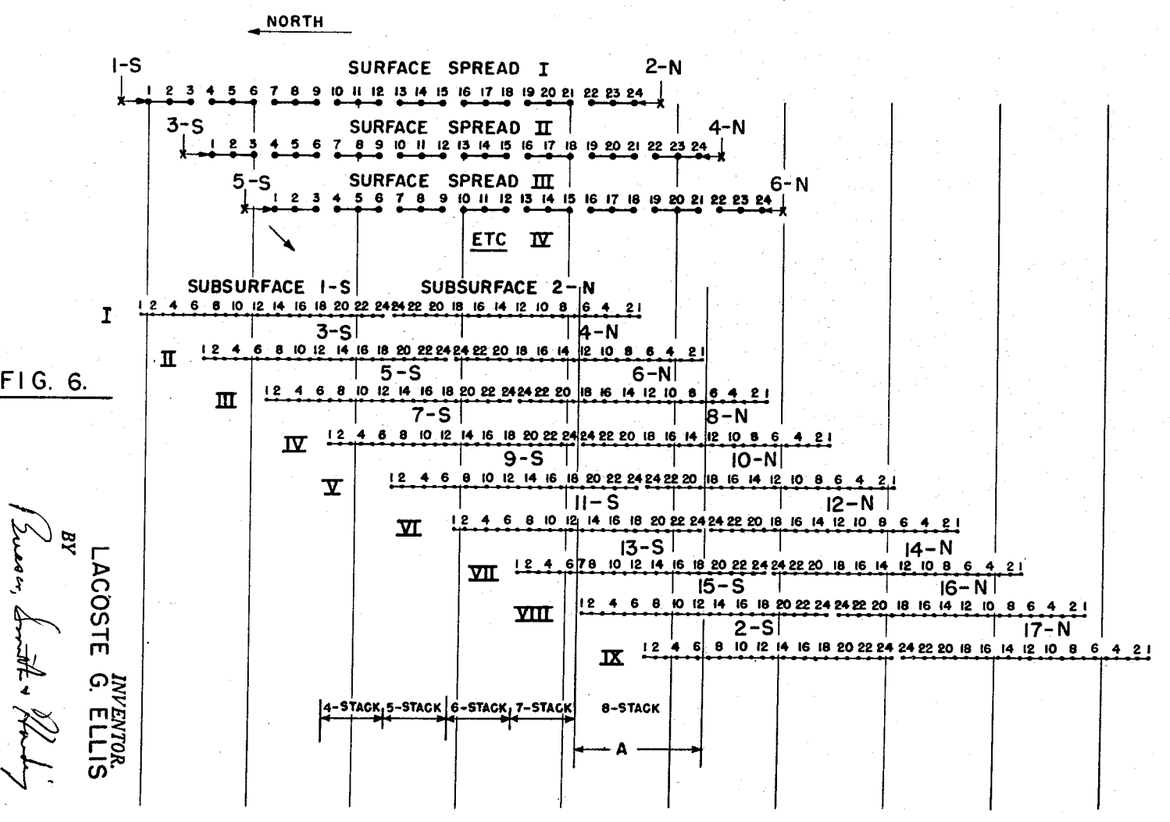
FIGURE 6, 6A and 6B are charts showing a method of horizontal shot stacking which may be employed to produce the records involved in the invention.

In FIGURE 6 there is illustrated one horizontal stacking exploration system suitable for use in connection with the production of the records in accordance with the technique of the invention. This technique involves the use of a spread comprising 24 channels with the detector groups spaced at 200-foot intervals. Each spread comprises shotpoints located a distance of 100 feet outwardly each end. For example, for the surface spread I the shotpoints are indicated at 1–S and 2–N. The subsurface reflection points are illustrated in the lower portion of the chart of FIGURE 6. It will thus be apparent that with the surface spread I the detonation of shots at points 1–S and 2–N will produce vibrations which are reflected from the 24 subsurface area indicated and received by the detectors 1–24 at the surface. Thus, the subsurface 1–S receives vibrations from the shotpoint 1–S and reflects the same from the locations indicated to the detectors at the surface, the reflection points being numbered so that the higher the number, the greater the spread distance from the shotpoint. Thus, the reflection from the location on the subsurface 1–S designated number 1 is the shortest spread reflection, and the reflection from the location on subsurfaces 1–S designated number 24 is the longest spread reflection, with the intermediate numbered reflections progressing in corresponding fashion over progressively increasing spreads from numbers 1 to 24, respectively. Likewise the reflection points 1 to 24 indicated at the subsurface 2–N reflect vibrations involving increasing spreads from shotpoint 2–N as the numbers increase. Thus, a vibration will pass from shotpoint 1–S to the reflection points 1–24 on subsurface 1–S upwardly to the detectors 1–24, respectively. On the other hand, by reason of the designation shown, a vibration will pass from the shotpoint 2–N to the reflection points 1 to 24 on subsurface 2–N for reflection up to the detectors 24 to 1, respectively. This will be evident from the arrangement of the parts shown in FIGURE 6.

After the first surface spread is shot, the three rear detector groups (i.e. 1, 2 and 3 of surface spread I) are picked up and positioned on the advancing end to produce the surface spread II which is now 600 feet forward from the preceding spread. The shotpoints are located 100 feet off each end and the shots are detonated. The subsurface for the spread II is indicated in FIGURE 6 with the reflection surfaces being indicated at 3–S and 4–N corresponding to the shotpoints 3–S and 4–N. It will be noted that a similar designation of the reflection points is provided in FIGURE 6 for each of the surface spreads, and thus, the higher the number, the greater the spread distance.

Figure 6A:
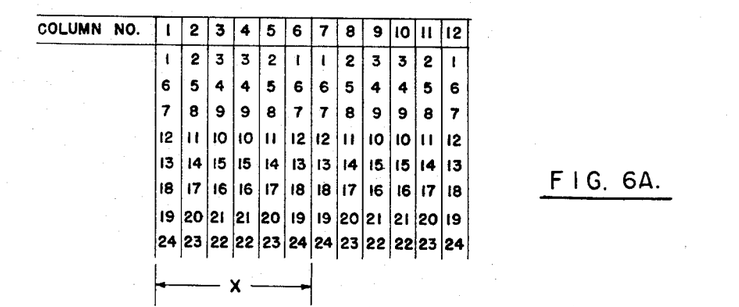

The above discussed procedure is continuously repeated for eight times to provide a total of nine shots. The location of the subsurface reflection areas for all nine shots is illustrated in FIGURE 6 at I to IX although the surface spread for only the first three surface spreads I, II and III are indicated. However, it will be obvious that these will progress in the manner described above. An eight stack record can be produced from the reflections indicated in the region A in FIGURE 6, and the detail of the stack from the region A is tabulated in FIGURE 6A wherein each of the twelve columns are arranged so that the reflections progress downwardly from the lowest number reflection to the highest number reflection, which in effect is a progression from the shortest spread distance to the longest spread distance. It will be noted that the first three columns 1–3, which represent the stacked data for the first three depth points, are different but that the next three columns 4–6 are mirror images thereof. The next six columns 7–12 repeat the arrangement for the first six columns 1–6. The above represents a twelve trace, eight stack procesesd record comprising individual reflection data which can be reproduced to represent the results of the seismographic exploration by stacking and mixing apparatus of conventional type.

Figure 6B:
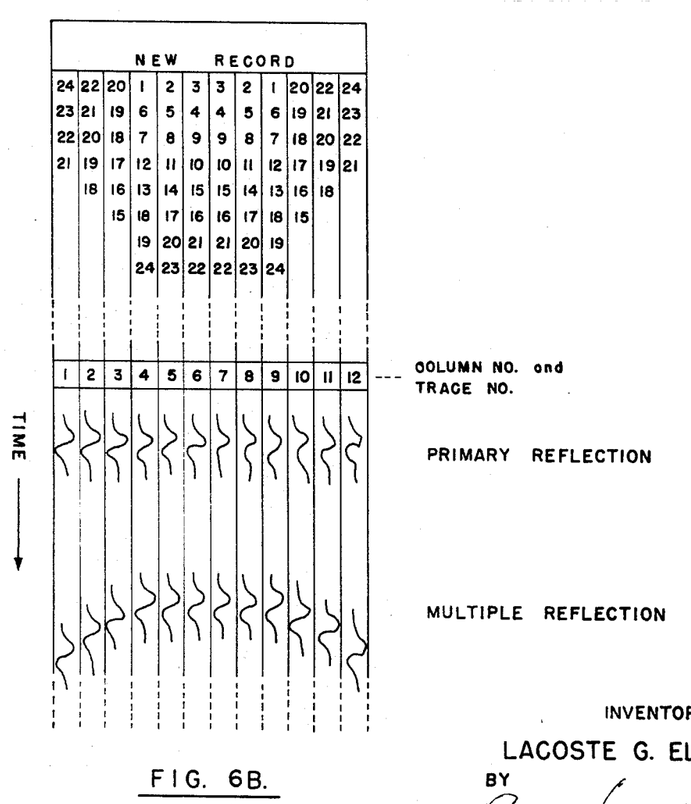

In accordance with the technique of the invention, a new record is produced with the data stacked in the manner illustrated in FIGURE 6B. In this arrangement, the data from reflection points in the first six columns of FIGURE 6A, indicated at X, are combined by stacking and mixing and placed on the six inside channels or traces of the new record, i.e., traces 4 to 9. Then out of the first three columns 1–3 of the record illustrated in FIGURE 6A, the four longest spread data, namely 21, 22, 23 and 24, are stacked and mixed and recorded on trace No. 1 of FIGURE 6B.

Trace No. 2 of the new record of FIGURE 6B comprises a combination of the two shortest length reflections included in trace No. 1, i.e., Nos. 22 and 21, and the three next longest reflections, i.e., Nos. 20, 19 and 18. This is illustrated in column 2 of the upper portion of FIGURE 6B. Trace No. 3 of the record shown in FIGURE 6B comprises the three shortest reflections used at trace No. 2, i.e., Nos. 20, 19 and 18, and the next three longest spreads 17, 16 and 15. This is shown in column No. 3 in the upper portion of FIGURE B. Traces No. 10, 11 and 12 are made up in a manner similar to traces 3, 2 and 1, respectively. This can be seen from a consideration of FIGURE 6B wherein it is noted that the columns 10, 11 and 12 comprise the same reflections as columns 1, 2 and 3, respectively.

With this type of processing technique, if a particular event is a primary reflection, the long traces 1, 2, 3, 10, 11 and 12 of FIGURE 6B will be fully corrected and the event will progress across the record in a generally straight line. This is illustrated by the top record trace of FIGURE 6B. If, however, the event is any type of multiple, these longer traces will not be fully corrected and will arrive late by an amount corresponding to the amount of residual which is not corrected. In this case, the event will not progress in a straight line across the record, but traces 1, 2, 3 and 10, 11 and 12 will be curved by the amount of the residual remaining. This is illustrated by the bottom record trace of FIGURE 6B.

In accordance with the invention, each successive group of depth points, or six columns of data are treated in a manner similar to that area indicated at A in FIGURE 6 and the final process records are assembled to make a record section corresponding to the normal presentation produced in accordance with the current practices. By proper selection of the speed of recording the processed records, i.e., the film speed, the proper use of photographic reproduction, the horizontal and vertical scales can be kept in the same scale as the original.

Figure 7:
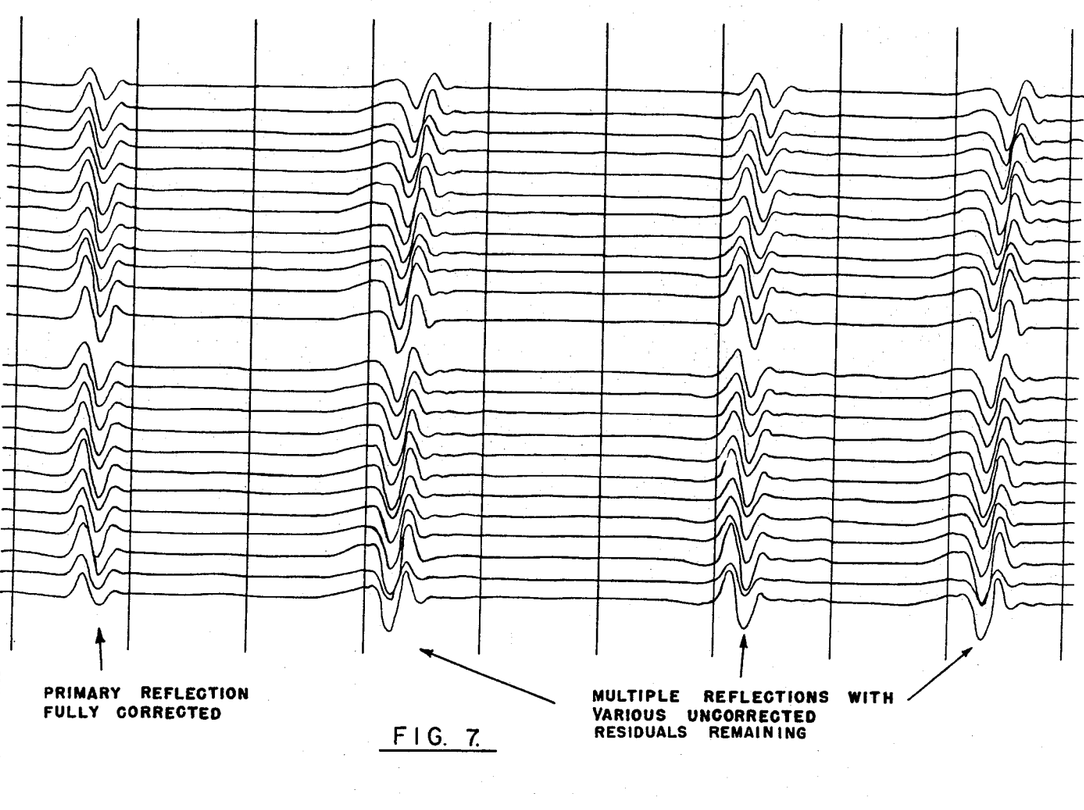
FIGURES 7, 8 and 9 are views of records showing primary and multiple reflections and illustrate the results obtainable in accordance with the invention.
Figure 8:
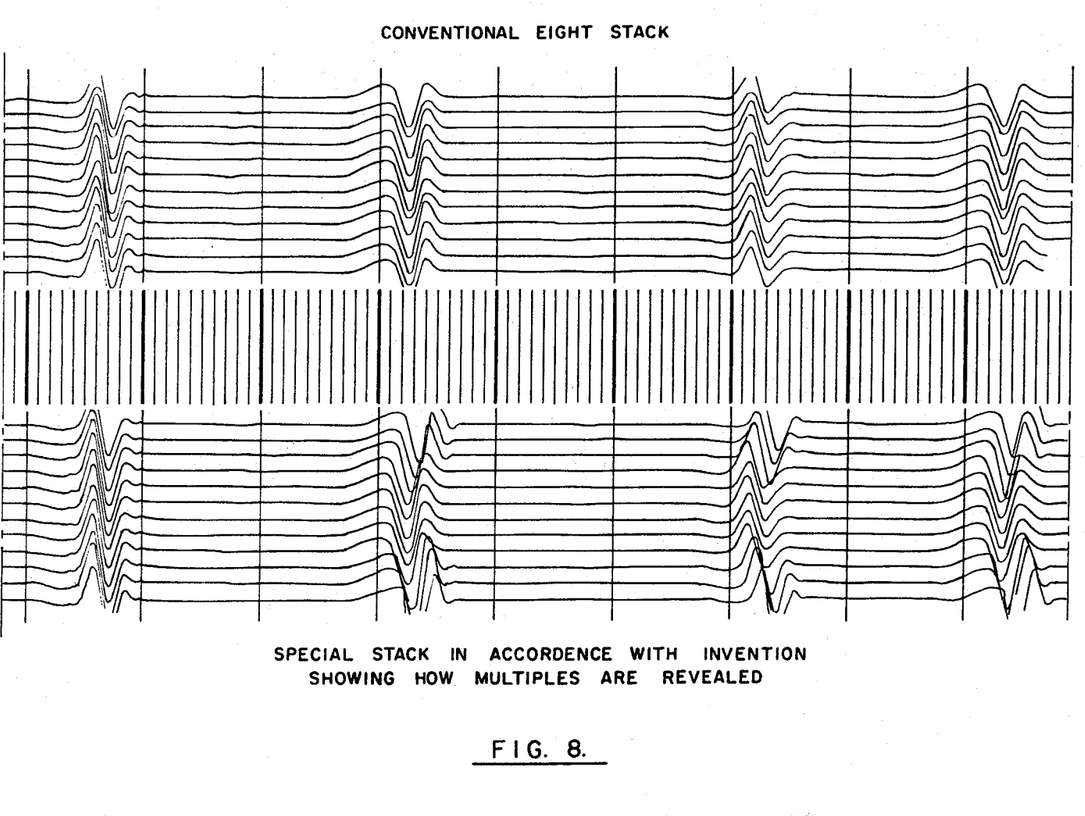
Figure 9:
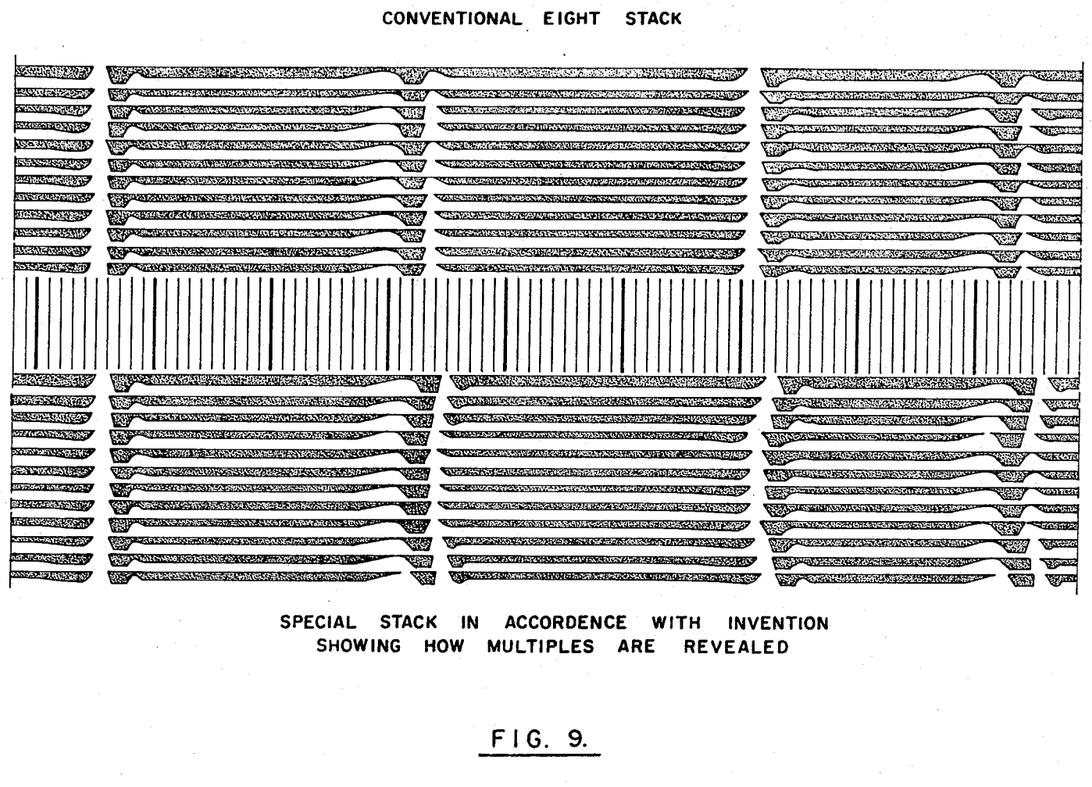

The record shown in FIGURE 7 shows a series of hypothetical reflections after normal stepout has been applied. The first event on the left end of the figure is a primary reflection and is fully corrected. All subsequent events have left varying degrees of residual stepout. The record shown in FIGURE 8 represents the data produced from the record of FIGURE 7 by both the normal stacking procedure and the procedure in accordance with the invention. The conventional stacking procedure is shown in the upper portion of FIGURE 8 whereas the procedure in accordance with the invention is shown in the lower portion thereof. FIGURE 9 is similar to FIGURE 8 with the exception that the record is a variable area record.

It is believed that an examination of FIGURES 7 and 8 illustrates the improved results produced by using the method in accordance with the invention. It is apparent from these figures that the multiple reflections can be more readily determined from a consideration of the lower records in FIGURES 8 and 9, which records display a definite curved upper and lower ends.

It is to be understood that the method in accordance with the invention may be modified without departing from the scope of the invention and is not to be considered limited except as required by the following claims.

I claim:

1. In a method of seismic surveying including the production of seismic data by a horizontal shot stacking technique in which data is recorded of a plurality of reflections from the same subsurface area, but spread different amounts and having different lengths of travel paths, said data being produced by a plurality of detonations from different locations in accordance with the horizontal stacking technique, each record of a reflection having the normal stepout corrections applied thereto, the improvement comprising the mixing and stacking of said reflection records in composite records on a multiple-channel record by combining one group of said reflection records in which there are a plurality of long and short spread reflections and recording these combined records on a plurality of the inner channels of said multiple-channel record, and combining a second group of said reflection records in which there are only the larger spread reflections included in said data and recording these combined records on a plurality of said multiple-channel record channels on the outsides of said inner channels, said second group being arranged so that the outermost channel thereof is composed of longer spread reflection records than a channel inwardly thereof.

2. The method according to claim 1 in which said horizontal shot stacking technique produces data providing at least an eight stack.

3. The method according to claim 2 in which said one group of reflection records consists of the stacking and mixing of at least eight reflection records from the same subsurface location for each trace provided on the multiple-channel record.

4. The method according to claim 3 wherein the outermost traces produced from said second group of reflection records comprises at least four of the largest spread reflections comprised in said data.

5. The method according to claim 4 in which the traces inwardly of said outermost traces are comprised of some but not all of said reflection records employed in producing said outermost traces.

6. The method according to claim 2 wherein said horizontal shot stacking technique includes 24 detectors and in which said multiple-channel record comprises 12 traces.

References Cited

UNITED STATES PATENTS 3,353,152  11/1967  Kerns _____________ 340—15.5

RODNEY D. BENNETT, *Primary Examiner.*

C. E. WANDS, *Assistant Examiner.*